(12) United States Patent
Kalandyk et al.

(10) Patent No.: US 10,904,348 B2
(45) Date of Patent: Jan. 26, 2021

(54) SCANNING SHARED FILE SYSTEMS (71) Applicant: INTERNATIONAL BUSINESS MACHINES CORPORATION, Armonk, NY (US)

(72) Inventors: Piotr Kalandyk, Zielonki (PL); Grzegorz Piotr Szczepanik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/417,496

(22) Filed: May 20, 2019

(65) Prior Publication Data
US 2020/0374354 A1 Nov. 26, 2020

(51) Int. Cl.
*G06F 15/173* (2006.01)
*H04L 29/08* (2006.01)
*G06F 16/182* (2019.01)
*G06F 16/13* (2019.01)
*H04L 12/26* (2006.01)

(52) U.S. Cl.
CPC .............. *H04L 67/22* (2013.01); *G06F 16/13* (2019.01); *G06F 16/1827* (2019.01); *H04L 43/08* (2013.01); *H04L 67/1097* (2013.01)

(58) Field of Classification Search
CPC ..... H04L 67/22; H04L 67/1097; H04L 43/08; G06F 16/1827; G06F 16/13
See application file for complete search history.

(56) References Cited

U.S. PATENT DOCUMENTS

| | | | | |
|---|---|---|---|---|
| 8,086,627 | B2* | 12/2011 | Pastorelli | G06F 11/3006 707/770 |
| 8,490,076 | B2* | 7/2013 | Wolf | G06F 16/148 717/170 |
| 9,535,677 | B2* | 1/2017 | Gierlak | G06F 8/60 |
| 2004/0133577 | A1* | 7/2004 | Miloushev | H04L 67/1097 |
| 2005/0120025 | A1* | 6/2005 | Rodriguez | G06F 16/1824 |
| 2007/0189153 | A1* | 8/2007 | Mason | G06F 16/1824 370/216 |
| 2016/0026449 | A1* | 1/2016 | Gierlak | G06F 8/61 717/175 |
| 2017/0141991 | A1 | 5/2017 | Godowski et al. | |

OTHER PUBLICATIONS

Mell et al., "The NIST Definition of Cloud Computing," National Institute of Standards and Technology, Sep. 2011, p. 1-3, Special Publication 800-145.

* cited by examiner

*Primary Examiner* — Richard G Keehn
(74) *Attorney, Agent, or Firm* — Rakesh Roy (57) ABSTRACT

A method, computer system, and a computer program product for scanning a shared resource in a network is provided. The present invention may include, assigning, to a set of active nodes of a network, a list of stored files associated with identifying software signatures in a shared resource of the network in a first scan cycle. The present invention may also include, receiving, from the set of active nodes of the network, a set of software signatures identified in the shared resource of the network, based on the assigned list of stored files. The present invention may further include, in response to at least one performance benchmark value associated with the set of active nodes of the network, adjusting the assigned list of stored files to optimize utilization of the set of active nodes for identifying software signatures in the shared resource in a subsequent scan cycle.

20 Claims, 7 Drawing Sheets

SCANNING SHARED FILE SYSTEMS

BACKGROUND

The present invention relates generally to the field of computing, and more particularly to asset management.

In distributed computing systems, assets, such as software products, may be available to all devices connected to the network. An inventory of the assets may be maintained to identify and track usage of licensed and unlicensed software products.

SUMMARY

Embodiments of the present invention disclose a method, computer system, and a computer program product for scanning a shared resource in a network. The present invention may include, assigning, to a set of active nodes of a network, a list of stored files associated with identifying software signatures in a shared resource of the network in a first scan cycle. The present invention may also include, receiving, from the set of active nodes of the network, a set of software signatures identified in the shared resource of the network, based on the assigned list of stored files. The present invention may further include, in response to at least one performance benchmark value associated with the set of active nodes of the network, adjusting the assigned list of stored files to optimize utilization of the set of active nodes for identifying software signatures in the shared resource in a subsequent scan cycle.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for scanning shared resources in a network. As such, the present embodiment has the capacity to improve the technical field of asset management by utilizing one or more active nodes (e.g., endpoint devices) of a network to scan chunks of a shared file system, where the chunks may be optimized based on one or more performance (e.g., scanning) benchmarks or criteria associated with the active node. More specifically, an asset management program may scan a shared resource (e.g., remote file system; shared file system) for files stored therein and may generated a full list of stored files ordered alphabetically (e.g., using file path name). Next, the asset management program may divide the list of files into chunks. Initially, the chunks may include the same number of files and the number of chunks may be determined by the number of active nodes in the network. Each chunk may be defined by a starting file path name and an ending file path name. The asset management program may instruct each active node to perform a software scan within the scope of the respective (e.g., assigned) chunk. Then, the asset management program may receive—at a selected interval (e.g., once per day)—a list of one or more software signatures discovered in the respective chunks from each active node. In one embodiment, the asset management program may also receive performance benchmark data (e.g., central processing unit (CPU) utilization; scanning speed estimation) from each active node. Thereafter, the asset management program may generate a new list of chunks for assigning to the active nodes for a subsequent (e.g., next) scan cycle, where the chunks may be adjusted or optimized for each active node based on the respective performance benchmark value or data associated with the active node.

As described previously, in distributed computing systems, assets, such as software products, may be available to all devices connected to the network. An inventory of the assets may be maintained to identify and track usage of licensed and unlicensed software products. Software asset management tools such as, IBM® (IBM and all IBM-based trademarks and logos are trademarks or registered trademarks of International Business Machines Corporation and/or its affiliates) BigFix® (BigFix and all BigFix-based trademarks and logos are trademarks or registered trademarks of International Business Machines Corporation and/or its affiliates) Inventory and IBM® License Metric Tool may be used to scan shared resources (e.g., shared disks) for installed software products.

According to one embodiment, the shared resource may include a file system (or parts thereof) and/or disk in a computer network which may be shared among different active nodes (e.g., endpoint devices). The shared resource may include a storage system which may be accessed by multiple active nodes. In one embodiment, the shared resource may store application programs, software programs, or other computing assets which may be executed on the endpoint devices. The programs may be stored only in the shared resource but may be installed on and accessed by the endpoint devices connected to the shared resource.

The shared resource may include a large storage system. In one embodiment, a computer designated to scan all the files in the shared resource for software signatures may take a long time to complete the task. The scanning task may be CPU intensive and may be slowed down further by other processes running in the designated computer. In at least one embodiment, after the scan of the shared resource, the designated computer may match the discovered files against the software signatures stored in a catalog. However, because the contents of the catalog may grow after every system update, the scanning task may be further slowed down. In one embodiment, the scanning task may be repeated every week which may utilize the hardware of the designated computer in cycles. If the designated computer fails, no scan data may be available until the scanning task is designated to another active node.

Therefore, it may be advantageous to, among other things, provide a way to unify the scanning process by distributing the workload (e.g., chunks of the shared file system) to the active nodes based on a set of criteria associated with respective active nodes, such as, performance benchmark data.

Figure 1:
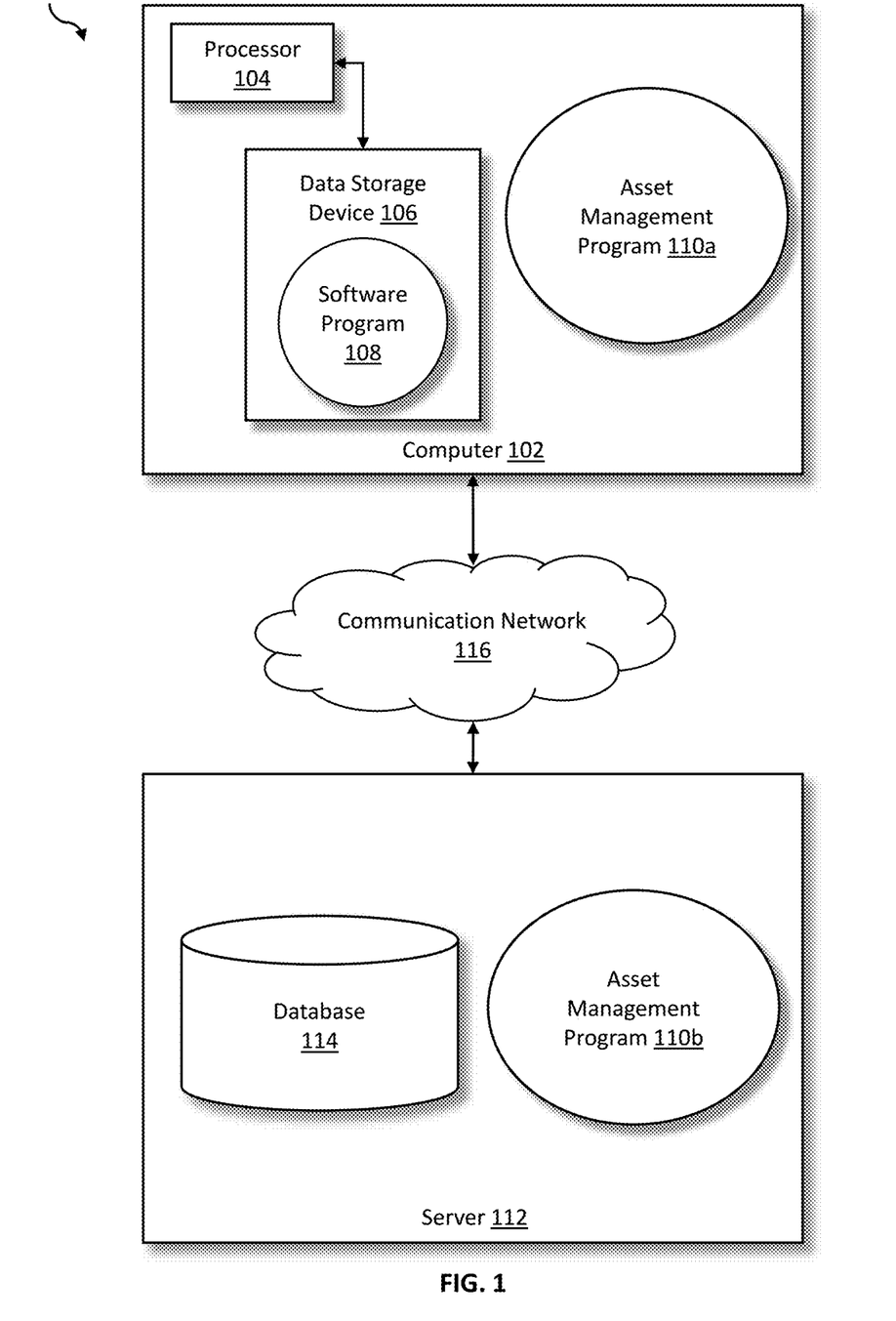
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an asset management program 110a. The networked computer environment 100 may also include a server or server computer 112 that is enabled to run an asset management program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. According to at least one embodiment, the client computer 102 may comprise an active node (e.g., endpoint device) and the server computer 112 may comprise the shared file system (e.g., shared resource) and an inventory server (e.g., for asset management; software signature catalog). The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the asset management program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the asset management program 110a, 110b (respectively) to distribute—across one or more active nodes in the network—the workload of scanning the shared resource for installed software, where the workload distribution is optimized based on the performance benchmark values of the active nodes. The distributed scanning method is explained in more detail below with respect to FIGS. 2 to 4.

Figure 2:
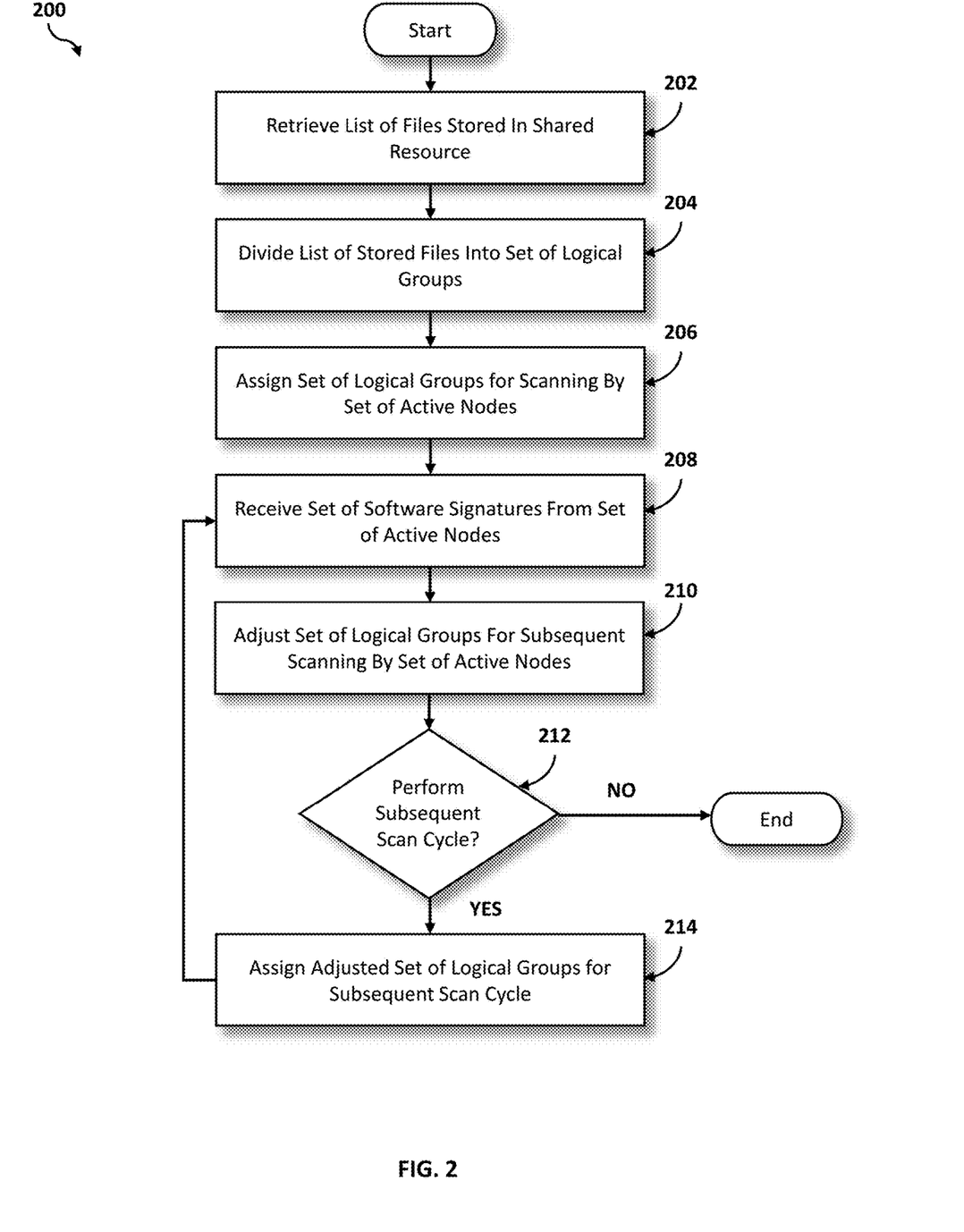
FIG. 2 is an operational flowchart illustrating a process for distributed scanning according to at least one embodiment.

Referring now to FIG. 2, an operational flowchart illustrating the exemplary distributed scanning process 200 used by the asset management program 110a and 110b according to at least one embodiment is depicted.

At 202, a list of files stored in a shared resource is retrieved. The asset management program 110a, 110b may scan the files stored in the shared resource (e.g., one or more remote storage resources) of a network (e.g., networked computer environment 100) and retrieve (e.g., via communication network 116) the list of stored files. In one embodiment, the asset management program 110a, 110b may run on the inventory server (e.g., asset management server; server 112) and may be in communicative contact with the shared resource. The asset management program 110a, 110b may include a scanning module which may be implemented to scan a storage device (e.g., database 114) of the shared resource, identify the files stored in the storage device of the shared resource, and generate a list of file paths (e.g., directory, folder, subfolder) associated with locations of the files stored in the shared resource.

For example, the inventory server 112 running the asset management program 110a, 110b communicates with the shared resource via communication network 116. The asset management program 110a, 110b executes the scanning module to scan and identify the files stored in the storage device of the shared resource. The scanning module identifies 20 files stored in the storage device of the shared resource and returns a list of the 20 stored files—including the file path names—to the asset management program 110a, 110b.

Then at 204, the list of stored files are divided into a set of logical groups. Once the asset management program 110a, 110b retrieves the list of stored files, the asset management program 110a, 110b may sort or organize the list of stored files. In one embodiment, the list of stored files may be organized alphabetically by the file path names. In another embodiment, the list of stored files may be organized by file size. According to other embodiments, the list of stored files may be organized according to any suitable sorting metric (e.g., last access time).

Next, the asset management program 110a, 110b may determine the number of computer devices deployed or connected (e.g., active nodes) to the network (e.g., via communication network 116) and may divide the list of stored files into chunks or logical groups based on the number of active nodes. Each chunk may be defined by a starting file path name and an ending file path name. According to one embodiment, the asset management program 110a, 110b may initially (e.g., first set of logical groups for first scan cycle) divide the list of stored files such that each chunk includes the same number of files. In another embodiment, the asset management program 110a, 110b may initially divide the list of stored files such that each chunk includes substantially the same number of files (e.g., if number of active nodes and number of stored files cannot be divided evenly).

Continuing with the previous example, the asset management program 110a, 110b organizes the list of 20 stored files alphabetically. Then, the asset management program 110a, 110b determines that there are four active nodes connected to communication network 116 and divides the list of 20 stored files, organized alphabetically, into four corresponding chunks of files. For the first scan cycle, the asset management program 110a, 110b divides the list of 20 stored files equally and includes five files in each of the four chunks.

Then at 206, the set of logical groups are assigned to the set of active nodes for scanning. The asset management program 110a, 110b may utilize the computational power of the active nodes to scan the chunks or logical groups for identifying installed software products in the shared resource. In one embodiment, the asset management program 110a, 110b may communicate (e.g., via communication network 116) with each active node in the set of active nodes and may instruct the active node to perform a scan for installed software products within a scope of the chunk assigned to the active node. In one embodiment, the asset management program 110a, 110b may indicate, in the communication with the active node, the file path names for scanning by the active node.

In response, the set of active nodes may access the shared resource (e.g., via mounting the shared file system) and scan the files included in the assigned chunk. In one embodiment, the asset management program 110a, 110b may enable the active node to map or link the file path name associated with the storage location in the shared resource to a software product identification (e.g., software signature).

Continuing with the previous example, the asset management program 110a, 110b communicates, via communication network 116, with active node 1, active node 2, active node 3, and active node 4 and assigns to each active node, chunk 1, chunk 2, chunk 3, and chunk 4, respectively. Specifically, the asset management program 110a, 110b instructs: active node 1 to scan the five files included in chunk 1 (e.g., file_path_A; file_path_B; file_path_C; file_path_D; file_path_E), active node 2 to scan the five files included in chunk 2 (e.g., file_path_F; file_path_G; file_path_H; file_path_I; file_path_J), active node 3 to scan the five files included in chunk 3 (e.g., file_path_K; file_path_L; file_path_M; file_path_N; file_path_O), and active node 4 to scan the five files included in chunk 4 (e.g., file_path_P; file_path_Q; file_path_R; file_path_S; file_path_T). In response, the set of active nodes mount the shared resource and perform a scan to discover software signatures associated with the files in the scope of the assigned chunk.

Then at 208, a set of software signatures is received from the set of active nodes. Once the scans of the chunks are completed by the active nodes, the active nodes may generate a result, for example, a report indicating any discovered software signatures in the respective chunks. The asset management program 110a, 110b may import the discovered software signatures (e.g., installed software products) from the active nodes and compare the software signatures against a software identification catalog stored in the inventory server. The asset management program 110a, 110b may utilize the comparison to reconcile the installed software products with the software licenses available (e.g., purchased software licenses) to the shared resource. In one embodiment, the asset management program 110a, 110b may import the discovered software signatures from the active nodes once per day (e.g., by default). In another embodiment, the asset management program 110a, 110b may provide an option to the user to select a user-defined scan and import cycle (e.g., once per week). In at least one embodiment, the asset management program 110a, 110b may enable a scheduling of the scanning and reporting by the active nodes based on the workload of the active nodes. As such, the active nodes may not need to perform a batch reporting to the asset management program 110a, 110b.

Continuing with the previous example, the asset management program 110a, 110b instructs the active nodes to import the discovered software signatures to the inventory server. In response, the set of software signatures are transmitted via communication network 116 from the set of active nodes to the inventory server.

Then at 210, the set of logical groups are adjusted for a subsequent (e.g., next) scanning by the set of active nodes. In addition to the discovered software signatures, the asset management program 110a, 110b may gather or receive data from the active nodes associated with a performance benchmark value of the active node associated with a previous (e.g., first) scan cycle. In one embodiment, the performance benchmark (e.g., performance metric) value may include criteria such as, CPU utilization, scanning speed estimation, hardware status, connection status, and any other suitable computer health and performance metric. The asset management program 110a, 110b may adjust the set of logical groups (e.g., chunks) optimized by the performance benchmark values (e.g., scanning speed estimation, CPU utilization) provided by the active nodes. In one embodiment, the optimization by the asset management program 110a, 110b may include adjusting each chunk size (e.g., number of files, size of files) according to the performance benchmark of the associated active node for the subsequent (e.g., next) scan cycle.

Continuing with the previous example, the asset management program 110a, 110b receives the performance benchmark values for the four active nodes and determines that active node 1 includes the highest scanning speed of the set of active nodes and active node 2 includes the lowest scanning speed of the set of active nodes. Thereafter, the asset management program 110a, 110b adjusts the chunks such that chunk 1 for active node 1 includes seven files, chunk 2 for active node 2 includes three files, chunk 3 for active node 3 includes five files, and chunk 4 for active node 4 includes five files.

Thereafter at 212, the asset management program 110a, 110b determines whether to perform the subsequent scan cycle. The asset management program 110a, 110b may initiate the subsequent (e.g., next) scan cycle based on a default schedule set by the program or a user-defined schedule enabled by the asset management program 110a, 110b.

If the asset management program 110a, 110b determines at 212 that the subsequent (e.g., next) scan cycle is not scheduled for the current time, the asset management program 110a, 110b ends the distributed scanning process 200 until a subsequent scheduled scan cycle.

However, if at 212, the asset management program 110a, 110b determines that the subsequent scan cycle is scheduled for the current time, then at 214, the asset management program 110a, 110b assigns the adjusted set of logical groups for the subsequent scan cycle. According to one embodiment, the asset management program 110a, 110b may assign the adjusted set of logical groups (e.g., chunks) for scanning by the set of active nodes in a manner similar to the process at 206. Then, the asset management program 110a, 110b may return to 208 to receive the set (e.g., second set) of software signatures from the set of active nodes for the subsequent scan cycle.

According to another embodiment, the distributed scanning process 200 used by the asset management program 110a and 110b may run in a continuous loop while the inventory server, shared resource, and at least one active node are up and running.

Continuing with the previous example, in response to determining that the next scan cycle is scheduled for the current time, the asset management program 110a, 110b communicates, via communication network 116, with the four active nodes to assign the adjusted chunks for the next scan cycle. Specifically, for the next scan cycle, active node 1 is instructed to scan chunk 1 (now including seven files), active node 2 is instructed to scan chunk 2 (now including three files), active node 3 is instructed to scan chunk 3 (including five files), and active node 4 is instructed to scan chunk 4 (including five files).

Figure 3:
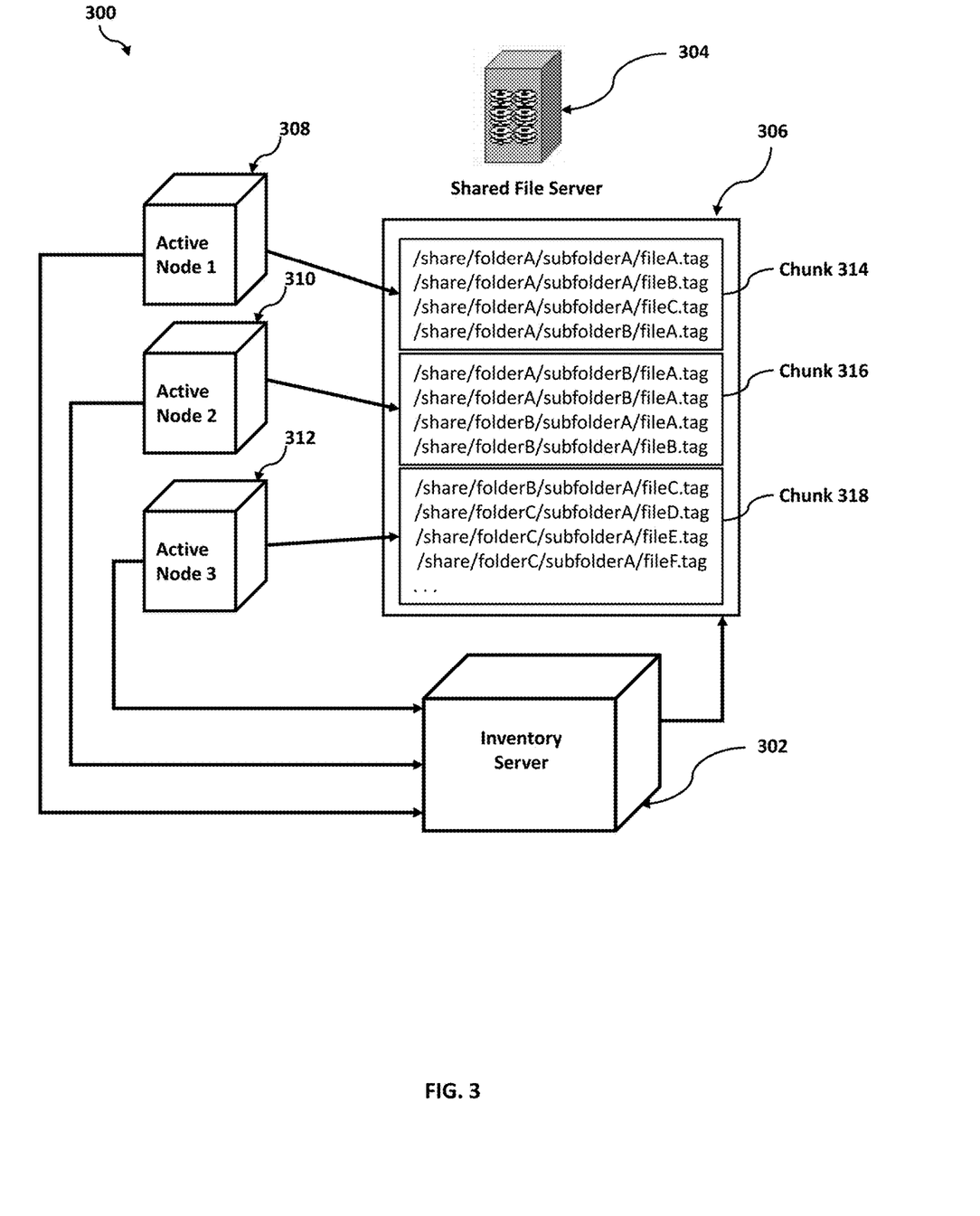
FIG. 3 is a block diagram illustrating a first exemplary scan implemented by an asset management program according to at least one embodiment.

Referring now to FIG. 3, a block diagram illustrating a first exemplary scan 300 implemented by the asset management program 110a, 110b according to at least one embodiment is depicted.

The asset management program 110a, 110b may run on an inventory server 302 (e.g., asset management server; server 112) and may be in communicative contact with a shared file server 304 (e.g., shared resource of an asset management environment) as previously described at 202. The asset management program 110a, 110b may scan the shared file server 304 and retrieve (e.g., via communication network 116) a list of stored files 306 including the file path names of the files stored in a storage device of the shared file server 304 as previously described at 202. For example, the asset management program 110a, 110b may identify 12 files stored in the storage device of the shared file server 304 and may return the file path names of the 12 files in the list of stored files 306.

Once the asset management program 110a, 110b retrieves the list of stored files 306, the asset management program 110a, 110b may organize the list of stored files 306 alphabetically by the file path names, as illustrated in FIG. 3 and previously described at 204. Next, the asset management program 110a, 110b may determine that three active nodes 308, 310, 312 are deployed in the asset management environment and may divide the list of stored files 306 into three chunks (e.g., logical groups) 314, 316, 318 based on the number of active nodes as previously described at 204. In the first or initial scan cycle, the asset management program 110a, 110b may divide the list of stored files 306 such that the chunks 314, 316, 318 include the same number of files. For example, the asset management program 110a, 110b may divide the 12 files in the list of stored files 306 such that each of the chunks 314, 316, 318 includes four files.

Then the asset management program 110a, 110b may assign chunk 314 to active node 308, chunk 316 to active node 310, and chunk 318 to active node 312 and instruct each active node to perform a scan for installed software products within a scope of the assigned chunk as previously described at 206. In response, the active nodes 308, 310, 312 may mount the shared file server 304 and map the file path names included in the respective chunks 314, 316, 318 to software signatures as previously described at 206. Thereafter, the active nodes 308, 310, 312 may communicate with the inventory server 302 (e.g., via communication network 116) to report any discovered software signatures in the respective chunks 314, 316, 318, as previously described at 208.

Figure 4:
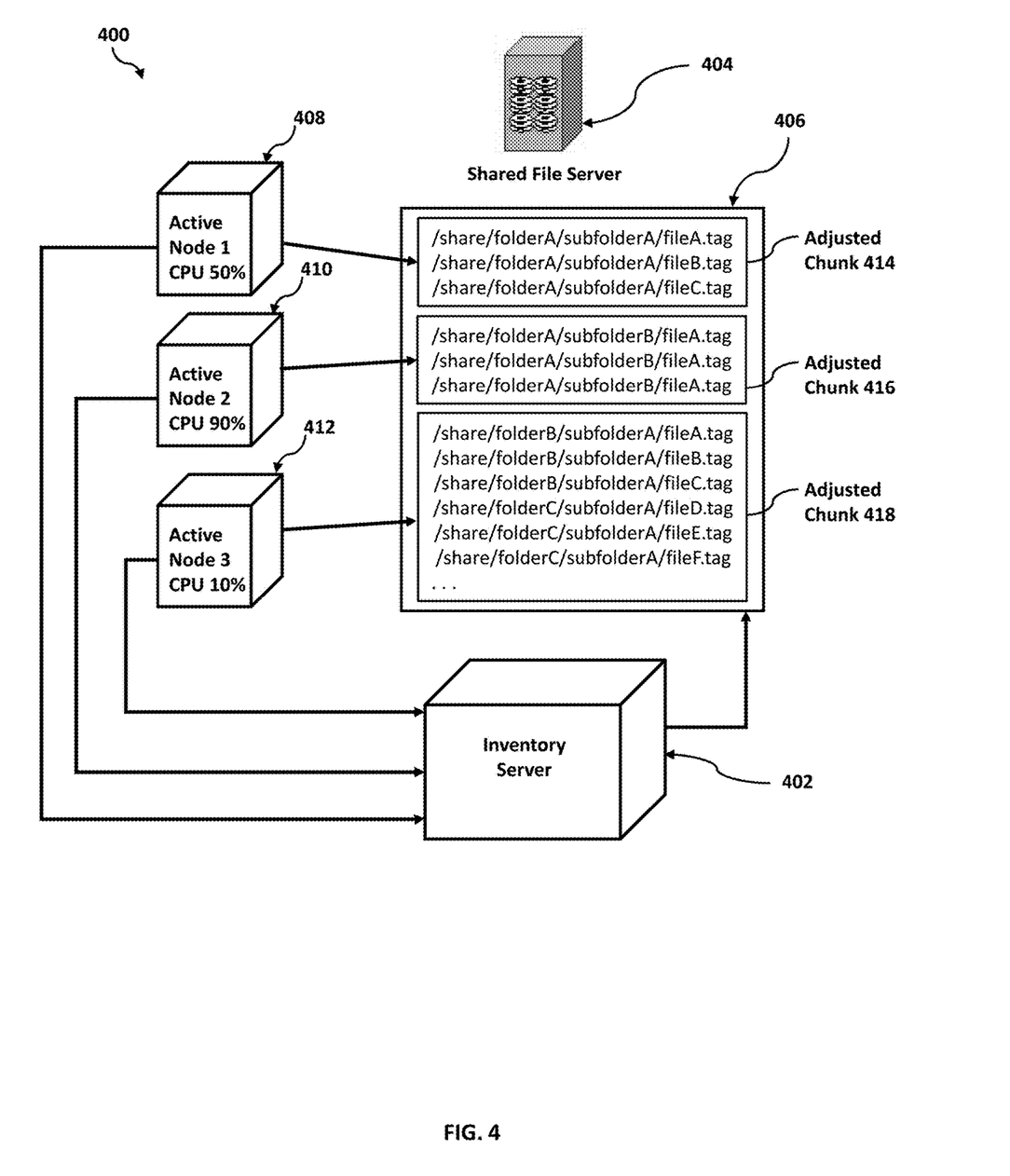
FIG. 4 is a block diagram illustrating a second exemplary scan implemented by the asset management program according to at least one embodiment.

Referring now to FIG. 4, a block diagram illustrating a second exemplary scan 400 implemented by the asset management program 110a, 110b according to at least one embodiment is depicted. The asset management program 110a, 110b may run on an inventory server 402 (e.g., asset management server; server 112) and may be in communicative contact with a shared file server 404 (e.g., shared resource of an asset management environment) as previously described at 202.

In addition to the discovered software signatures, the asset management program 110a, 110b may receive data from active nodes 408, 410, 412 associated with a performance benchmark value of the active node as previously described at 210. For example, active node 408 may transmit data (e.g., via communication network 116) to inventory server 402 indicating a CPU utilization of 50%. Similarly, active node 410 and active node 412 may each transmit data (e.g., via communication network 116) to inventory server 402 indicating a CPU utilization of 90% and 10% respectively.

The asset management program 110a, 110b may adjust the set of logical groups (e.g., chunks) optimized by the performance benchmarks (e.g., scanning speed estimation, CPU utilization) provided by the active nodes 408, 410, 412 as previously described at 210. For example, the asset management program 110a, 110b may provide a set of stored files 406 including adjusted chunks 414, 416, 418. The asset management program 110a, 110b may determine that active node 410 includes the highest CPU utilization or workload (e.g., 90%) and may therefore provide the adjusted chunk 416 to include less files and smaller file sizes for the next scan cycle. The asset management program 110a, 110b may determine that active node 412 includes the lowest CPU utilization (e.g., 10%) and may therefore be able to handle a greater workload. As such, the asset management program 110a, 110b may provide the adjusted chunk 418 to include more files and larger file sizes for the next scan cycle. The asset management program 110a, 110b may determine that active node 408 includes a CPU utilization (e.g., 50%) in between active node 410 and active node 412 and may therefore provide the adjusted chunk 414 to optimize the workload of active node 408 accordingly. Thereafter, during the next scan cycle, the asset management program 110a, 110b may assign the adjusted chunks 414, 416, 418 for scanning by the active nodes 408, 410, 412 as previously described at 214.

The functionality of a computer may be improved by the asset management program 110a, 110b because the asset management program 110a, 110b may enable multiple computers (e.g., active nodes) to share the workload of scanning a shared resource for installed software products. As described herein, the asset management program 110a, 110b may utilize the computational power of multiple active nodes which may enhance the scanning, discovering, and reporting speed associated with asset inventory management. In addition, the asset management program 110a, 110b may dynamically adjust the workload of each active node based on analyzing the performance benchmarks associated with each active node.

It may be appreciated that FIGS. 2 to 4 provide only an illustration of one embodiment and do not imply any limitations with regard to how different embodiments may be implemented. Many modifications to the depicted embodiment(s) may be made based on design and implementation requirements.

Figure 5:
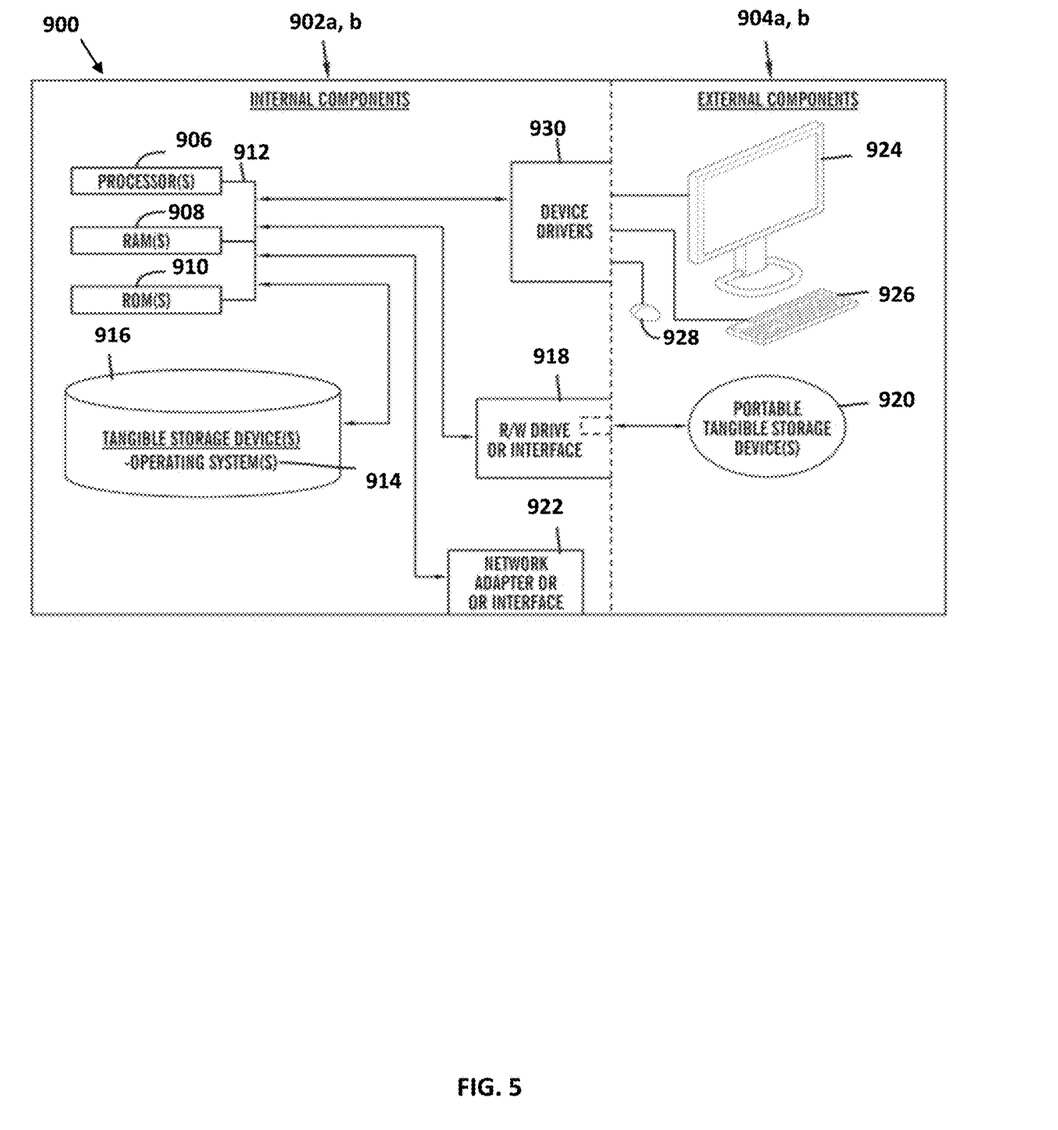
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the asset management program 110a in client computer 102, and the asset management program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the asset management program 110a and 110b can be stored on one or more of the respective portable computer-readable tangible storage devices 920, read via the respective R/W drive or interface 918 and loaded into the respective hard drive (e.g., computer-readable tangible storage devices) 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the asset management program 110a in client computer 102 and the asset management program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the asset management program 110a in client computer 102 and the asset management program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
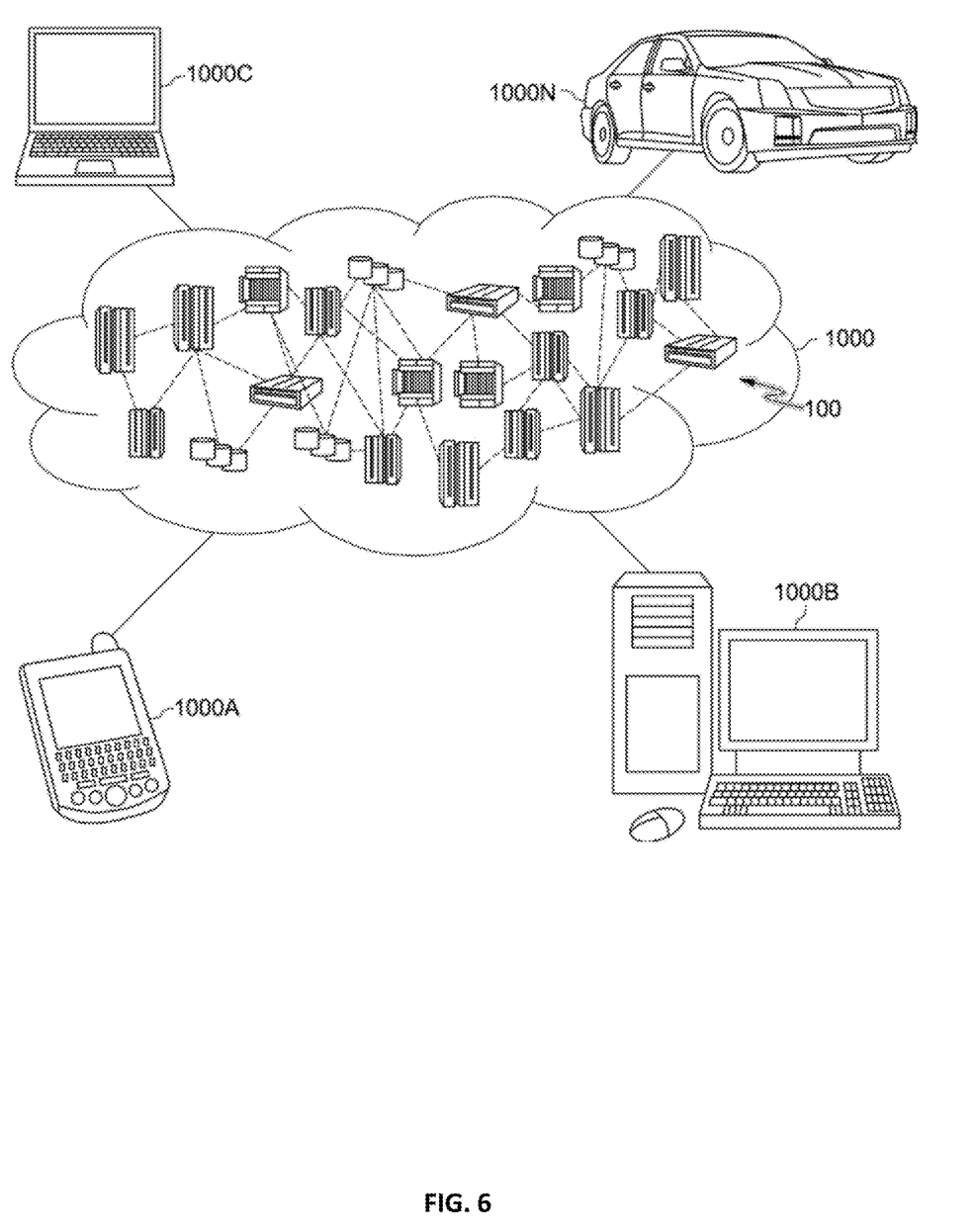
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 (e.g., networked computer environment 100) with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
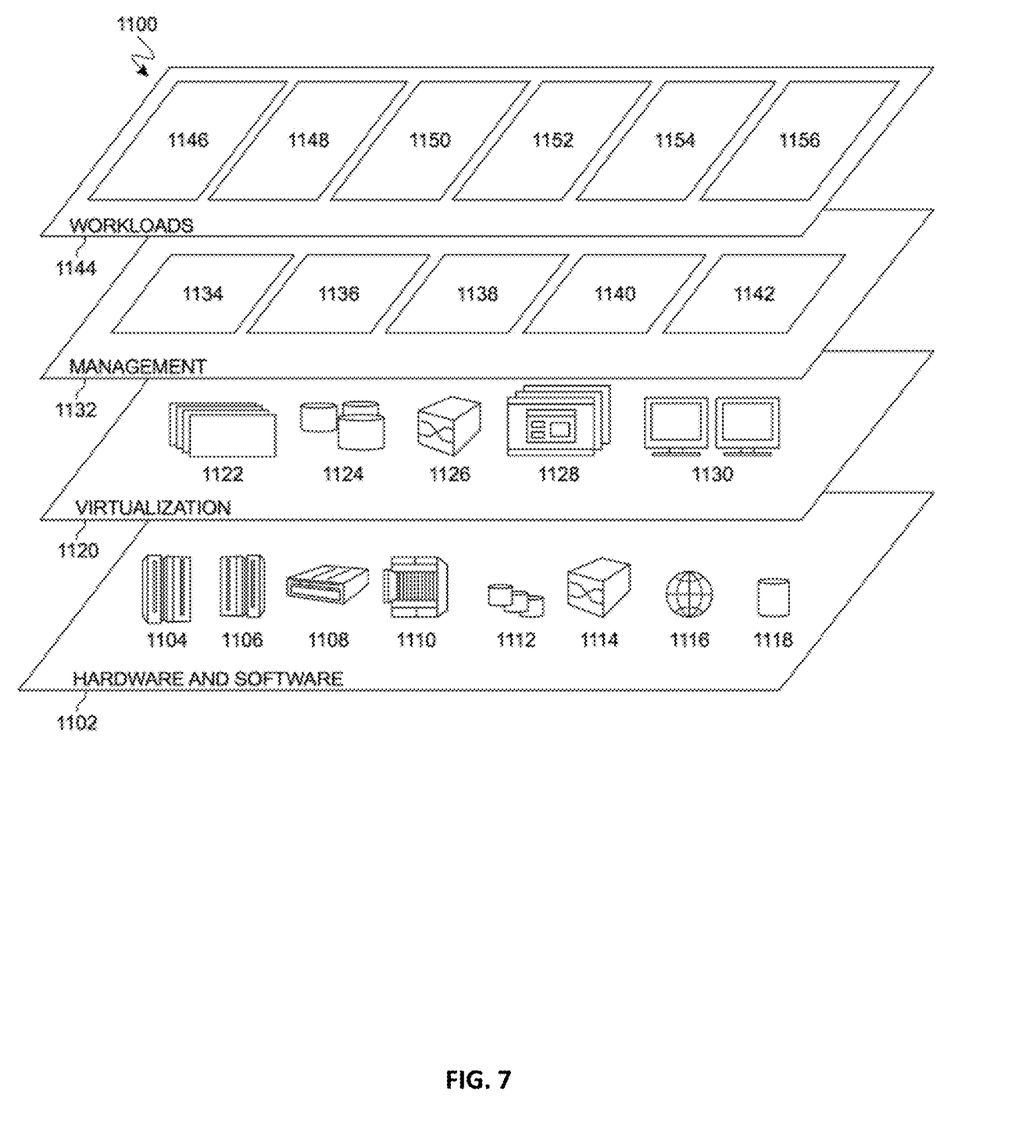
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and asset management 1156. A asset management program 110a, 110b provides a way to enable multiple computers (e.g., active nodes) to share in the workload of scanning a shared resource for installed software products.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
assigning, to a set of active nodes of a network, a list of stored files associated with identifying software signatures of software products installed in a shared resource of the network in a first scan cycle;
receiving, from the set of active nodes of the network, a set of software signatures identified in the shared resource of the network by the set of active nodes of the network, based on the assigned list of stored files, wherein the received set of software signatures indicate a corresponding set of software products installed in the shared resource of the network; and
in response to at least one performance benchmark value associated with the set of active nodes of the network, adjusting the assigned list of stored files to optimize utilization of the set of active nodes for identifying software signatures in the shared resource in a subsequent scan cycle.

2. The method of claim 1, further comprising:
scanning a storage device of the shared resource of the network to identify a plurality of files stored therein; and
generating the list of stored files including a plurality of file path names associated with a corresponding location of the plurality of files in the scanned storage device of the shared resource.

3. The method of claim 1, wherein assigning, to the set of active nodes of the network, the list of stored files associated with identifying software signatures in the shared resource of the network in the first scan cycle further comprises:
dividing the list of stored files into a set of logical groups based on a number of active nodes in the set of active nodes of the network; and
instructing the set of active nodes to scan for software signatures in the shared resource within a scope of a respective logical group.

4. The method of claim 3, wherein dividing the list of stored files into the set of logical groups based on the number of active nodes in the set of active nodes of the network further comprises:
providing, for the first scan cycle, a same number of files in each logical group of the set of logical groups.

5. The method of claim 1, wherein adjusting the assigned list of stored files to optimize utilization of the set of active nodes for identifying software signatures in the shared resource in the subsequent scan cycle further comprises:
instructing the set of active nodes to scan for software signatures in the shared resource within a scope of a respective logical group associated with the assigned list of stored files; and
adjusting the scope of the respective logical group for the subsequent scan cycle based on the at least one performance benchmark value received from a corresponding active node in a previous scan cycle.

6. The method of claim 1, further comprising:
sorting the list of stored files alphabetically based on a plurality of file path names associated with the list of stored files.

7. The method of claim 1, further comprising:
sorting the list of stored files based on a plurality of file sizes associated with the list of stored files.

8. The method of claim 1, wherein the at least one performance benchmark value includes a central processing unit (CPU) utilization associated with the set of active nodes.

9. The method of claim 1, wherein the at least one performance benchmark value includes a scanning speed estimation associated with the set of active nodes.

10. A computer system for scanning a shared resource in a network, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
assigning, to a set of active nodes of a network, a list of stored files associated with identifying software signatures of software products installed in a shared resource of the network in a first scan cycle;
receiving, from the set of active nodes of the network, a set of software signatures identified in the shared resource of the network by the set of active nodes of the network, based on the assigned list of stored files, wherein the received set of software signatures indicate a corresponding set of software products installed in the shared resource of the network; and
in response to at least one performance benchmark value associated with the set of active nodes of the network, adjusting the assigned list of stored files to optimize utilization of the set of active nodes for identifying software signatures in the shared resource in a subsequent scan cycle.

11. The computer system of claim 10, further comprising:
scanning a storage device of the shared resource of the network to identify a plurality of files stored therein; and
generating the list of stored files including a plurality of file path names associated with a corresponding location of the plurality of files in the scanned storage device of the shared resource.

12. The computer system of claim 10, wherein assigning, to the set of active nodes of the network, the list of stored files associated with identifying software signatures in the shared resource of the network in the first scan cycle further comprises:
dividing the list of stored files into a set of logical groups based on a number of active nodes in the set of active nodes of the network; and
instructing the set of active nodes to scan for software signatures in the shared resource within a scope of a respective logical group.

13. The computer system of claim 12, wherein dividing the list of stored files into the set of logical groups based on the number of active nodes in the set of active nodes of the network further comprises:
providing, for the first scan cycle, a same number of files in each logical group of the set of logical groups.

14. The computer system of claim 10, wherein adjusting the assigned list of stored files to optimize utilization of the set of active nodes for identifying software signatures in the shared resource in the subsequent scan cycle further comprises:
instructing the set of active nodes to scan for software signatures in the shared resource within a scope of a respective logical group associated with the assigned list of stored files; and
adjusting the scope of the respective logical group for the subsequent scan cycle based on the at least one performance benchmark value received from a corresponding active node in a previous scan cycle.

15. The computer system of claim 10, further comprising: sorting the list of stored files alphabetically based on a plurality of file path names associated with the list of stored files.

16. The computer system of claim 10, further comprising: sorting the list of stored files based on a plurality of file sizes associated with the list of stored files.

17. The computer system of claim 10, wherein the at least one performance benchmark value includes a central processing unit (CPU) utilization associated with the set of active nodes.

18. The computer system of claim 10, wherein the at least one performance benchmark value includes a scanning speed estimation associated with the set of active nodes.

19. A computer program product for scanning a shared resource in a network, the computer program product comprising a computer readable storage medium having program instructions embodied therewith, the program instructions executable by a processor to cause the processor to:

assign, to a set of active nodes of a network, a list of stored files associated with identifying software signatures of software products installed in a shared resource of the network in a first scan cycle;

receive, from the set of active nodes of the network, a set of software signatures identified in the shared resource of the network by the set of active nodes of the network, based on the assigned list of stored files, wherein the received set of software signatures indicate a corresponding set of software products installed in the shared resource of the network; and in response to at least one performance benchmark value associated with the set of active nodes of the network, adjust the assigned list of stored files to optimize utilization of the set of active nodes for identifying software signatures in the shared resource in a subsequent scan cycle.

20. The computer program product of claim 19, further comprising:

scanning a storage device of the shared resource of the network to identify a plurality of files stored therein; and generating the list of stored files including a plurality of file path names associated with a corresponding location of the plurality of files in the scanned storage device of the shared resource.

* * * * *